Aug. 1, 1967
E. SALVAIRE
3,333,367
APPARATUS FOR REMOVING FLASH
Filed Dec. 29, 1964
3 Sheets-Sheet 1
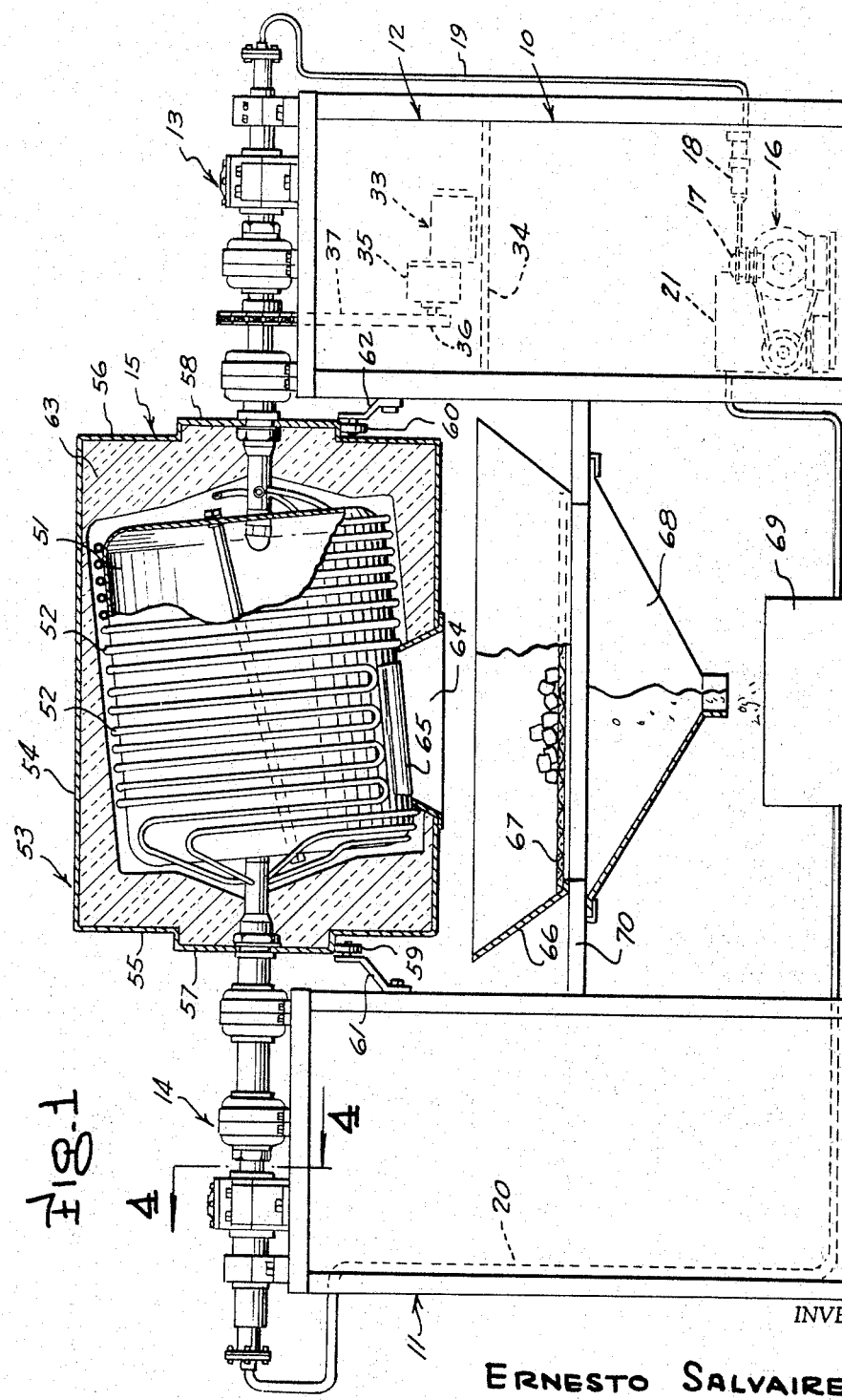
INVENTOR
ERNESTO SALVAIRE
BY Mason, Fenwick & Lawrence
ATTORNEYS

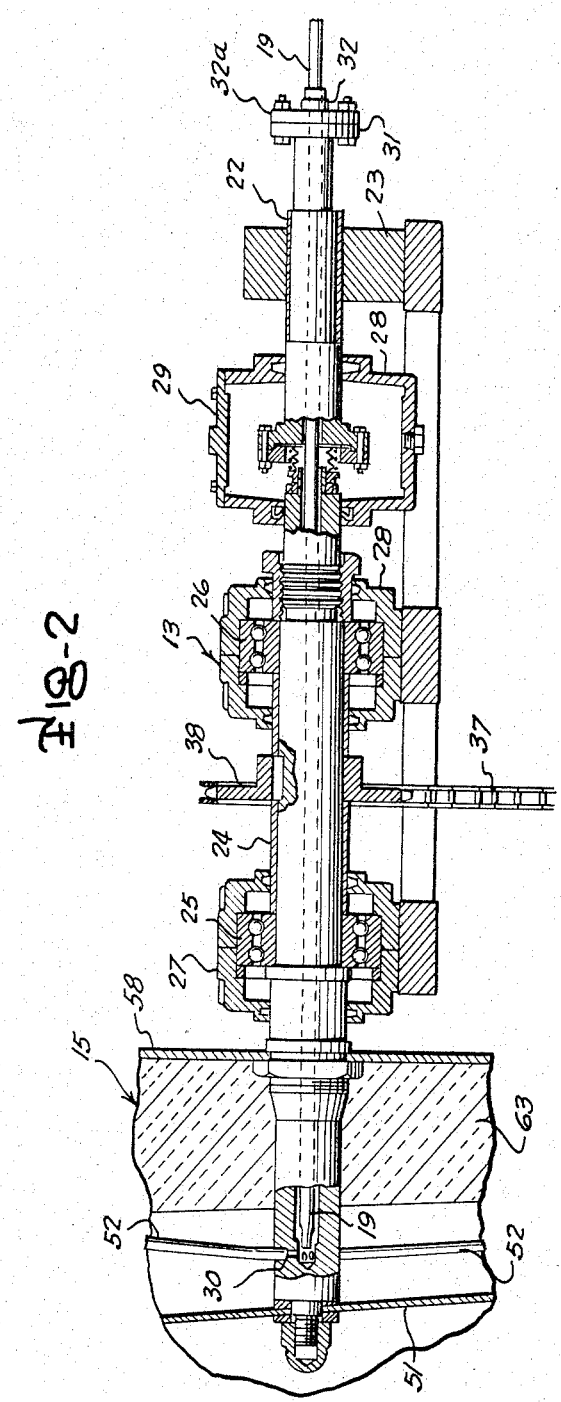

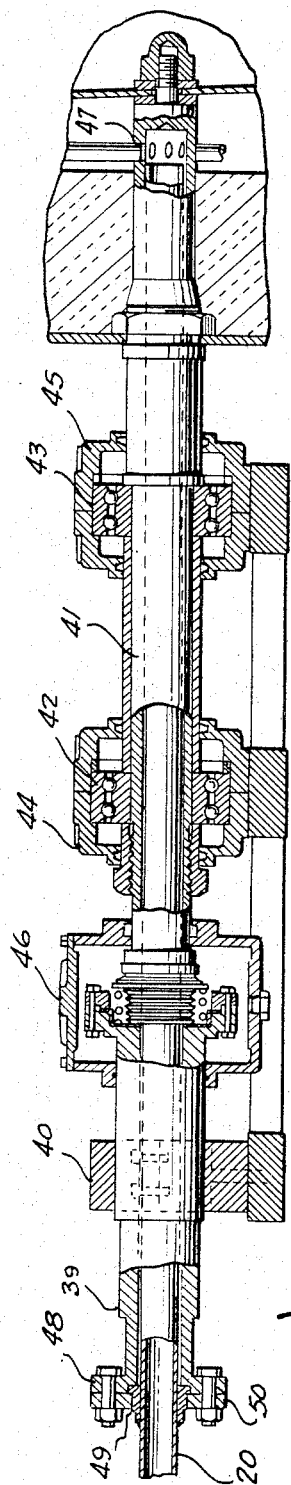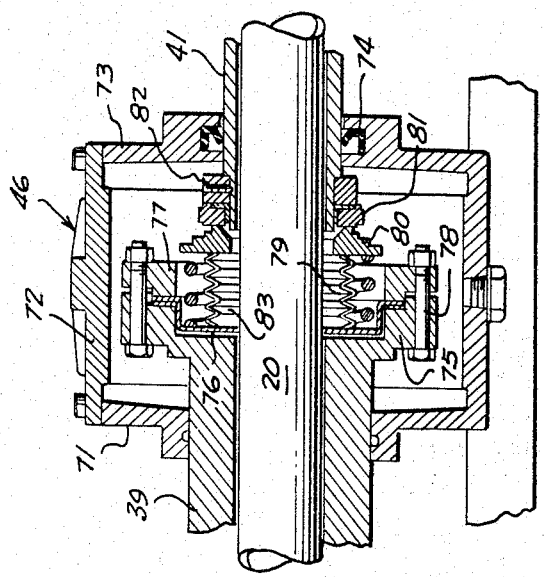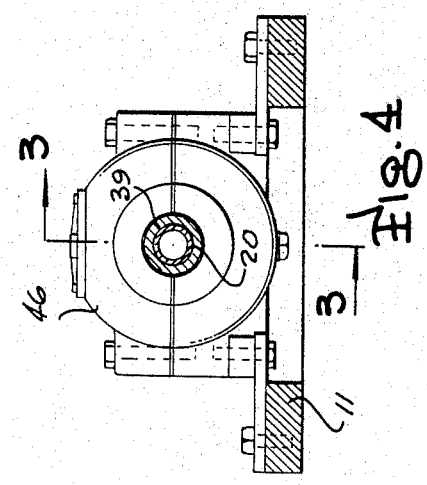

United States Patent Office 3,333,367
Patented Aug. 1, 1967

3,333,367
APPARATUS FOR REMOVING FLASH
Ernesto Salvaire, Via del Commercio 5,
Genoa-Nervi, Italy
Filed Dec. 29, 1964, Ser. No. 421,875
7 Claims. (Cl. 51—164)

ABSTRACT OF THE DISCLOSURE

An apparatus for removing flash from molded articles including a support means, a rotatable container for receiving the articles having heat exchange surfaces and a pair of rotatable hollow shafts rigidly connected to the container, the container having fluid passage means disposed in heat exchange relation therewith and communicating with the rotatable hollow shafts, means for rotating the container, a pair of stationary hollow tubes each mounted on the support means and extending into a respective one of the rotatable hollow shafts, sealing means disposed between each rotatable hollow shaft and the support means and means for supplying a refrigerant to the fluid passage means through the hollow tubes and shafts.

---

This invention relates to an apparatus for removing flash from molded articles and, more particularly, to a tumbling apparatus for removing flash from molded rubber articles and the like.

This application is a continuation-in-part of my co-pending application Ser. No. 186,128, filed Apr. 9, 1962, now abandoned.

In the art of molding rubber articles and the like, the articles usually are formed with a certain amount of flash which must be removed to complete the article. In the past, this flash was removed by trimming the articles manually, which involved a tedious and costly operation. Thereafter, it was found that such flash could be removed more economically by placing the rubber articles in a container with a sufficient amount of Dry Ice to reduce the temperature of the articles and cause them to become brittle, and then to tumble the articles, which would cause the brittle flash to be broken off. This method of removing flash has been found to be very successful, although it has several disadvantages. The type of apparatus normally employed in the prior art in practicing this method usually is not adapted to provide control of the cooling operation or regulation of the temperature of the container in which the articles are tumbled.

Accordingly, it is the principal object of this invention to provide an improved apparatus for removing flash from molded articles.

Another object of this invention is to provide an improved tumbling apparatus for removing flash from molded rubber articles and the like.

A further object of the present invention is to provide an improved tumbling apparatus for removing flash from molded rubber articles, having means for lowering the temperature of the articles, causing the articles to become brittle, thereby facilitating the breakage of the flash during the tumbling operation.

A still further object of the present invention is to provide an improved tumbling apparatus for removing flash from molded rubber articles by lowering the temperature of the articles, causing them to become brittle, and then tumbling the same, in which the temperature of the articles can be quickly lowered and easily regulated.

Another object of the present invention is to provide an improved tumbling apparatus for removing flash from molded rubber articles by lowering the temperature of the articles, causing them to become brittle, and then tumbling the same, which utilizes a refrigeration circuit for lowering the temperature of the articles.

A further object of this invention is to provide an improved tumbling apparatus for removing flash from molded rubber articles by lowering the temperature of the articles and then tumbling the same to break off the flash, in which the temperature is lowered by means of a refrigeration circuit, and wherein improved sealing means is provided between the movable and stationary parts thereof.

Another object of the present invention is to provide an improved apparatus for removing flash from molded rubber articles, which is comparatively simple in construction, inexpensive to manufacture, and economical to operate and maintain.

Other objects of the present invention will become more apparent to those persons skilled in the art, from the following description taken in conjunction with the accompanying drawings, in which:

FIGURE 1 is a side elevational view of an embodiment of the invention, illustrating the tumbling drum in vertical section and having portions thereof broken away;

FIGURE 2 is an enlarged partial section of the embodiment illustrated in FIGURE 1, shown in vertical cross-section;

FIGURE 3 is a second enlarged partial section of the embodiment illustrated in FIGURE 1, shown in vertical cross-section;

FIGURE 4 is a cross-sectional view taken along line 4—4 in FIGURE 1;

FIGURE 5 is an enlarged cross-sectional view taken along line 5—5 in FIGURE 4.

Briefly described, the present invention relates to an apparatus for removing flash from molded articles, generally comprising a support means, a rotatable container for receiving the articles, having heat exchange surfaces and a pair of rotatable hollow shafts rigidly connected to the container in axial alignment with each other, bearing means mounted on the support means supporting the rotatable hollow shafts, the container having fluid passage means disposed in heat exchange relation therewith and communicating with the rotatable hollow shafts, means for rotating the container mounted on the support means, a pair of stationary hollow tubes each mounted on the support means extending into a respective one of the rotatable hollow shafts, sealing means disposed between each rotatable hollow shaft and the support means, and means for supplying a refrigerant to the fluid passage means through the hollow tubes and shafts.

Referring to the drawings, there is illustrated an embodiment of the invention. Specifically referring to FIGURE 1, the apparatus generally includes a frame member 10, having a pair of spaced post members 11 and 12, an inlet support assembly 13 mounted on the post member 12, a discharge support assembly 14 mounted on the post member 11, a tumbler assembly 15 mounted on the inner ends of the support assemblies 13 and 14, and a refrigeration system 16 mounted on the frame member 10. The refrigeration system is substantially conventional, including a compressor 17, an expansion valve 18, a supply line 19 communicating with one end of the inlet support assembly 13, a return line 20 communicating with the discharge end of the discharge support assembly 14, and a condenser 21. The support assemblies 13 and 14, and the tumbler assembly 15 are provided with intercommunicating fluid passageways, as will later be described, communicating with lines 19 and 20 to complete the refrigeration circuit.

As best seen in FIGURE 2, the inlet support assembly 13 comprises a stationary hollow shaft 22 mounted on a mounting bracket 23, and an axially aligned rotatable hollow shaft 24 journaled in bearings 25 and 26 which are mounted in bearing housing members 27 and 28. Mounted on the stationary shaft 22 is a seal housing member 29 containing a seal assembly which will later be described. The fluid supply line 19 extends into and through the stationary hollow shaft 22 and the rotatable hollow shaft 24, coaxially terminating at the inner end thereof adjacent a plurality of radially extending outlet ports 30. The inlet end of the stationary shaft member 22 is provided with an annular flange 31, against which there is secured a fitting 32 in sealing relation to prevent leakage of fluid through the end of the stationary hollow shaft member 22. The fitting 32 is retained in place by means of an annular retaining member 32a bolted to the annular flange 31. The rotatable hollow shaft member 24 is driven by a motor 33 mounted on a suitable platform 34 on the post member 12, which transmits drive through a gear reduction unit 35, a sprocket member 36, a drive chain 37 and a sprocket wheel 38 mounted on the shaft member 24.

The discharge support assembly 14 is substantially similar to the inlet support assembly 13 and generally includes a stationary hollow shaft 39 mounted in a mounting block 40, an axially aligned rotatable hollow shaft 41 journaled in bearing members 42 and 43 mounted in bearing housing members 44 and 45, respectively, and a seal housing member 46 mounted on the inner end of the stationary hollow shaft member 39. Extending into the hollow shaft 39 is the discharge line 20 which extends along the entire length of the aligned hollow shaft members 39 and 41, terminating at the inner end of the rotatable hollow shaft member 41 adjacent a plurality of radially extending ports 47. The outer end of the stationary hollow shaft member 39 is provided with an annular flange 48 against which there is secured a fitting 49 sealing the interior of the hollow shaft 39 from the atmosphere. The fitting 49 is retained in place by an annular retaining member 50.

Referring to FIGURE 1, the tumbling assembly 15 includes a cylindrical drum 51 which is mounted on the inner ends of aligned rotatable hollow shaft members 24 and 41, having a plurality of heat exchange conduits 52 mounted on the exterior surface thereof in heat exchange relation with the drum 51 and which intercommunicate with the inlet ports 30 in the hollow shaft 24 and the discharge ports 47 in the rotatable hollow shaft member 41, to provide fluid passageways from the shaft member 24 through the inlet ports 30, conduits 52, the discharge ports 47 and the hollow shaft member 45. The axis of the drum 51 preferably is offset approximately 5° relative to the aligned axes of the shaft members 24 and 41. The drum 51 also is disposed within a housing member 53, having a cylindrical wall 54, end walls 55 and 56, and boss sections 57 and 58 which are mounted on the rotatable shaft members 24 and 41. The annular surfaces of the boss members 57 and 58 also rest on rollers 59 and 60 journaled in brackets 61 and 62, which are secured to the post members 11 and 12, respectively. The drum 51 and the conduits 52 are embedded in a suitable insulating material 63, which occupies the space between the drum 51 and the housing member 53. The insulating material can be of any type, although a light weight material such as polystyrene and the like, is preferred. The housing member 53 is provided with an opening 64 in the cylindrical wall thereof, which permits access to a door 65 in the drum 51. The door 65 is located at the lower end of the drum 51, to facilitate the removal of molded articles placed in the drum.

Mounted below the tumbling assembly is a receptacle 66 having a perforated bottom wall 67. The receptacle 66 is adapted to receive articles discharged through the opening 64 in the housing member 53 and to permit undersized particles, such as broken flash and the like, to pass through the perforated bottom wall 67 through a funnel section 68 into a discharge container 69. The receptacle member 66 and the funnel section 68 are supported on suitable spanning members 70 secured to the post members 11 and 12.

FIGURE 4 illustrates the seal assembly between the stationary hollow shaft member 39 and the rotatable hollow shaft member 41. The seal housing member 46 includes an end wall 71 rigidly mounted on the stationary shaft member 39, an annular wall member 72 rigidly secured to the end wall 71, and an end wall 73 secured to the annular wall 72, having an annular sealing element 74, providing a seal between the end wall 73 and the rotatable shaft 41. The inner end of the stationary shaft member 39 is provided with an annular mounting flange 75 on which there is mounted an annular base plate member 76 clamped against the inner face of the flange member 75 by means of an annular retainer plate 77. The retainer member 77 is secured to the annular flange 75 by means of a plurality of bolts 78. Mounted on the inner face of the annular base plate member 76 is a bellows 79, having an annular wear member 80 mounted on the inner end thereof. The wear member 80 is urged into sealing engagement with an annular wear member 81 mounted on a collar member 82 on the rotatable shaft member 41, by means of a spring member 83 interposed between the annular base plate member 76 and the wear member 80. The force exerted by the spring member 83 is suitable for urging the wear member 80 in sealing engagement with the wear member 81 to provide a sealed passageway between the stationary shaft member 39 and the rotatable shaft member 41. The seal assembly for the inlet support assembly 13 is substantially the same as the assembly described.

In the use of the apparatus, molded rubber articles are placed in the drum 51 through the opening provided in the housing member 53. After the door 65 is closed, the refrigeration system is turned on so that refrigerant is delivered through supply line 19, inlet ports 30 in the rotatable shaft member 24, the heat exchange conduits 52, discharge ports 47 in the rotatable shaft member 41, and return line 20 back to the compressor 21. The refrigerant passing through the heat exchange conduits 52 will lower the temperature within the drum 51 sufficiently to lower the temperature of the molded rubber articles, thus causing them to become brittle. As soon as this occurs, the motor 31 is energized to rotate the housing member 53. As the drum 51 rotates, the molded rubber articles are tumbled, causing the flash to be broken off. After the articles have been tumbled for a sufficient period of time, the refrigeration system and the drive motor 33 are turned off and the door in the position as shown in FIGURE 1 is opened to permit the trimmed articles and broken flash to fall into the receptacle 66. Most of the broken flash will fall through the perforated bottom wall 67 into the funnel 68 and discharge container 69.

The seal assembly illustrated in FIGURE 4 provides an effective seal between the stationary and rotatable shaft members to prevent the refrigerant under pressure, from escaping to the atmosphere. Furthermore, it will be noted that the lines 19 and 20 extend through the entire lengths of the rotatable and stationary shafts and terminate adjacent the inlet ports 30 and the discharge ports 47 in the rotatable shaft members, thereby preventing direct impingement of the refrigerant on the sealing means. The lines 19 and 20 have a diameter less than the diameter of the rotatable and hollow shafts through which they extend. In view of the fact there is provided an annular space between the lines 19 and 20 and the rotatable and stationary shafts, condensation on the lines 19 and 20 is prevented.

It will be appreciated that by the use of a refrigeration system in the apparatus as described, the temperature of the molded rubber articles placed in the tumbling container can be lowered in a very short period of time. In addition, it will be noted that the temperature of the molded rubber articles can be easily regulated. The apparatus thereby provides an effective tumbling apparatus which can be employed to remove flash from molded rubber articles and the like in a swift and efficient manner.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. An apparatus for removing flash from molded articles comprising a support means, a rotatable cylindrical container for receiving said articles having heat exchange surfaces and a pair of rotatable hollow shafts rigidly connected to said container in axial alignment with each other, the axis of said cylindrical container being disposed at an angle of 5° to said rotatable hollow shafts, bearing means mounted on said support means supporting said rotatable hollow shafts, said cylindrical container having fluid passage means disposed in heat exchange relation therewith and communicating with said rotatable hollow shafts, a rotatable housing mounted on said rotatable hollow shafts adjacent said bearing means, insulation means surrounding said rotatable cylindrical container supported by said rotatable housing, access means provided to the interior of said cylindrical container, receptacle means having a perforated bottom wall disposed on said support member for receiving said articles through said access means, means for rotating said container mounted on said support means, a pair of stationary hollow tubes each mounted on said support means and extending into a respective one of said rotatable hollow shafts, sealing means disposed between each rotatable hollow shaft and said support means, each of said stationary hollow tubes extending a sufficient distance into its associated rotatable hollow shaft so that direct impingement of refrigerant flowing from said stationary hollow tube to its associated rotatable hollow shaft, with the associated sealing means is prevented and means for supplying said refrigerant to said fluid passage means through said hollow tubes and shafts.

2. An apparatus for removing flash from molded articles according to claim 1, wherein said sealing means includes a bellows mounted on one of said rotatable and stationary shafts, a wear member mounted on the free end of said bellows disposed in sealing engagement with the other of said shafts and biasing means interposed between said one shaft and said wear member urging said wear member into positive sealing engagement with said other shaft thereby providing a fluid passageway through said shafts and said bellows sealed from the exterior thereof.

3. An apparatus for removing flash from molded articles according to claim 1, wherein associated rotatable and stationary shafts have opposed flanges and said sealing means includes an annular base plate member mounted on said stationary shaft flange, a bellows mounted on one end thereof on said base plate member, coaxially relative to said shafts, a first wear member mounted on said rotatable shaft flange, a second wear member mounted on the free end of said bellows disposed in sealing engagement with said second wear member and a spring interposed between said base plate member and said first wear member urging said first wear member into positive sealing engagement with said second wear member.

4. An apparatus for removing flash from molded articles comprising a support means, a rotatable cylindrical container for receiving said articles having heat exchange surfaces and a pair of rotatable hollow shafts rigidly connected to said container in axial alignment with each other, the axis of said cylindrical container being disposed at an angle to the axis of said rotatable hollow shafts, bearing means mounted on said support means supporting said rotatable hollow shafts, said cylindrical container having fluid passage means disposed in heat exchange relation therewith and communicating with said rotatable hollow shafts, a rotatable housing mounted on said rotatable hollow shafts adjacent said bearing means, insulation means surrounding said rotatable cylindrical container and supported by said rotatable housing, means for rotating said container mounted on said support means, a pair of stationary hollow tubes each mounted on said support means and extending into a respective one of said rotatable hollow shafts, sealing means disposed between each rotatable hollow shaft and one of said stationary hollow tubes, means for supplying a refrigerant to said fluid passage means through said hollow tubes and shafts and each of said sealing means including a bellows mounted on one of said rotatable and stationary shafts, a wear member mounted on the free end of said bellows disposed in sealing engagement with the other of said shafts and biasing means interposed between said one shaft and said wear member urging said wear member into positive sealing engagement with said other shaft thereby providing a fluid passageway through said shafts and said bellows sealed from the exterior thereof.

5. An apparatus for removing flash from molded articles comprising a support means, a rotatable cylindrical container for receiving said articles having heat exchange surfaces and a pair of rotatable hollow shafts rigidly connected to said container in axial alignment with each other, the axis of said cylindrical container being disposed at an angle to the axis of said rotatable hollow shafts, bearing means mounted on said support means supporting said rotatable hollow shafts, said cylindrical container having fluid passage means disposed in heat exchange relation therewith and communicating with said rotatable hollow shafts, a rotatable housing mounted on said rotatable hollow shafts adjacent said bearing means, insulation means surrounding said rotatable cylindrical container and supported by said rotatable housing, means for rotating said container mounted on said support means, a pair of stationary hollow tubes each mounted on said support means and extending into a respective one of said rotatable hollow shafts, sealing means disposed between each rotatable hollow shaft and one of said stationary hollow tubes, means for supplying a refrigerant to said fluid passage means through said hollow tubes and shafts and each set of said associated rotatable and stationary shafts have opposed flanges and each of said associated said sealing means including an annular base plate member mounted on said stationary shaft flange, a bellows mounted on one end thereof on said base plate member, coaxially relative to said shafts, a first wear member mounted on said rotatable shaft flange, a second wear member mounted on the free end of said bellows disposed in sealing engagement with said second wear member and a spring interposed between said base plate member and said first wear member urging said first wear member into positive sealing engagement with said second wear member.

6. An apparatus for removing flash from molded articles comprising a support means, a rotatable cylindrical container for receiving said articles having heat exchange surfaces and a pair of rotatable hollow shafts rigidly connected to said container in axial alignment with each other, the axis of said cylindrical container being disposed at a 5° angle to the axis of said rotatable hollow shafts, bearing means mounted on said support means supporting said rotatable hollow shafts, said cylindrical container having fluid passage means disposed in heat exchange relation therewith and communicating with said rotatable hollow shafts, means for rotating said container mounted on said support means, a pair of stationary hollow tubes each mounted on said support means and extending into a respective one of said rotatable hollow shafts, sealing means disposed between each rotatable hollow shaft and said support means, each of said stationary hollow tubes extending a sufficient distance into its associated rotatable hollow shaft so that direct impingement of refrigerant flowing from said stationary hollow tube to its associated rotatable hollow shaft, with the associated sealing means is prevented, means for supplying said refrigerant to said fluid passage means through said hollow tubes and shafts and each of said sealing means including a bellows mounted on one of said rotatable and stationary shafts, a wear member mounted on the free end of said bellows disposed in sealing engagement with the other of said shafts and biasing means interposed between said one shaft and said wear member urging said wear member into positive sealing engagement with said other shaft thereby providing a fluid passageway through said shafts and said bellows sealed from the exterior thereof.

7. An apparatus for removing flash from molded articles comprising a support means, a rotatable cylindrical container for receiving said articles having heat exchange surfaces and a pair of rotatable hollow shafts rigidly connected to said container in axial alignment with each other, the axis of said cylindrical container being disposed at a 5° angle to the axis of said rotatable hollow shafts, bearing means mounted on said support means supporting said rotatable hollow shafts, said cylindrical container having fluid passage means disposed in heat exchange relation therewith and communicating with said rotatable hollow shafts, means for rotating said container mounted on said support means, a pair of stationary hollow tubes each mounted on said support means and extending into a respective one of said rotatable hollow shafts, sealing means disposed between each rotatable hollow shaft and said support means, each of said stationary hollow tubes extending a sufficient distance into its associated rotatable hollow shaft so that direct impingement of refrigerant flowing from said stationary hollow tube to its associated rotatable hollow shaft, with the associated sealing means is prevented, means for supplying said refrigerant to said fluid passage means through said hollow tubes and shafts and each set of said associated rotatable and stationary shafts having opposed flanges and each of said associated said sealing means including an annular base plate member mounted on said stationary shaft flange, a bellows mounted on one end thereof on said base plate member, coaxially relative to said shafts, a first wear member mounted on said rotatable shaft flange, a second wear member mounted on the free end of said bellows disposed in sealing engagement with said second wear member and a spring interposed between said base plate member and said first wear member urging said first wear member into positive sealing engagement with said second wear member.

References Cited

UNITED STATES PATENTS

| | | | |
|---|---|---|---|
| 904,231 | 11/1908 | Schou | 62—346 X |
| 1,226,542 | 5/1917 | Leitch | 62—346 X |
| 2,263,072 | 11/1941 | Doering | 62—346 X |
| 2,307,548 | 1/1943 | Stone | 62—346 X |
| 2,344,922 | 3/1944 | Raver | 62—346 X |
| 2,682,732 | 7/1954 | Hanvahan | 51—13 X |
| 2,881,571 | 4/1959 | Granata | 51—314 X |

FOREIGN PATENTS 685,711  1/1953  Great Britain.

HAROLD D. WHITEHEAD, *Primary Examiner.*